United States Patent
Kritov et al.

(10) Patent No.: US 7,616,585 B1
(45) Date of Patent: Nov. 10, 2009

(54) PREVENTING NETWORK MICRO-CONGESTION USING SEND PACING BASED ON END-TO-END BANDWIDTH

(75) Inventors: Slava Kritov, Palo Alto, CA (US); Hans F. van Rietschote, Sunnyvale, CA (US)

(73) Assignee: Symantec Operating Corporation, Cupertino, CA (US)

( * ) Notice: Subject to any disclaimer, the term of this patent is extended or adjusted under 35 U.S.C. 154(b) by 653 days.

(21) Appl. No.: 11/364,050

(22) Filed: Feb. 28, 2006

(51) Int. Cl.
*G01R 31/08* (2006.01)

(52) U.S. Cl. ...................... 370/252; 370/231

(58) Field of Classification Search ............ 375/E7.001, 375/E7.026, E7.211, E7.212, E7.215, E7.219; 370/229, 230, 231, 230.1
See application file for complete search history.

(56) References Cited

U.S. PATENT DOCUMENTS

| | | | | |
|---|---|---|---|---|
| 2003/0185154 | A1* | 10/2003 | Mullendore et al. | 370/230 |
| 2006/0165166 | A1* | 7/2006 | Chou et al. | 375/240.05 |
| 2007/0016688 | A1* | 1/2007 | Hester et al. | 709/238 |
| 2007/0115814 | A1* | 5/2007 | Gerla et al. | 370/230 |

OTHER PUBLICATIONS

I. Wakeman, A. Ghosh, and J. Crowcroft, "Implementing Real Time Packet Forwarding Policies Using Streams," Proc. of the USENIX 1995 Technical Conference, Jan. 1995. http://citeseer.ist.psu.edu/wakeman95implementing.html.

"HTB Linux queuing discipline manual—user guide"; Devera; May 5, 2002; http://luxik.cdi.cz/~devik/qos/htb/manual/userg.htm.

"VMTP: Versatile Message Transaction Protocol"; Protocol Specification; Cheriton Computer Science Department, Stanford University; Feb. 1988; http://citeseer.ist.psu.edu/190649.html.

"Kernel korner: analysis of the HTB queuing discipline"; Benita; Linux Journal; vol. 2005, Issue 131 ; Mar. 2005.

(Continued)

*Primary Examiner*—Chi H Pham
*Assistant Examiner*—Fan Ng
(74) *Attorney, Agent, or Firm*—Rory D. Rankin; Meyertons Hood Kivlin Kowert & Goetzel, P.C.

(57) ABSTRACT

A system for preventing network micro-congestion using send pacing based on end-to-end bandwidth. The system includes one or more processors and memory coupled to the processors, wherein the memory contains program instructions executable by the processors to obtain an estimate of end-to-end network bandwidth available to a particular application-level data transfer operation in progress over a network between a first endpoint and a second endpoint. Based at least in part on the estimate of end-to-end bandwidth, the instructions are further executable to introduce a delay between transmissions of two or more successive messages or packets of the particular application-level data transfer operation from the first endpoint.

20 Claims, 9 Drawing Sheets

OTHER PUBLICATIONS

"Querying libiptc HOWTO: 14. Controlling Flows"; Linux Online, Inc.; 'Internet; 2005; http://www.linux.org/docs/ldp/howto/Querying-libiptc-HOWTO/cflows.html.

"Managing Web server performance with AutoTune agents"; Diao, et al; IBM Systems Journal; vol. 42, Issue 1 ; Jan. 2003; http://portal.acm.org/citation.cfm?id=1014767.1014768.

"TCP Selective Acknowledgment Options"; Mathis, et al; Sun Microsystems, Inc., Oct. 1996; http://www.ietf.org/rfc/rfc2018.txt.

"Link-sharing and Resource Management Models for Packet Networks"; Floyd, et al; IEEE\ACM Transactions on Networking; vol. 3, No. 4, Aug. 1995.

* cited by examiner

PREVENTING NETWORK MICRO-CONGESTION USING SEND PACING BASED ON END-TO-END BANDWIDTH

BACKGROUND OF THE INVENTION

1. Field of the Invention

This invention relates to computer systems and, more particularly, to the management of network traffic between computer systems.

2. Description of the Related Art

In today's enterprise environments, more and more applications rely on bulk data transfers to accomplish their functionality. Applications that require large amounts of data to be transferred between one network endpoint and another for a single application-level job or task may include, for example, storage management applications of various types (such as backup and restore applications, disaster recovery applications etc.), media server applications that may be required to transmit movie and audio files, telephony (e.g., voice over IP) and other telecommunications applications, scientific analysis and simulation applications, geographically distributed software development projects, and so on. The amount of data that has to be transferred for a given job or task varies with the specific applications and use cases, but can easily reach several tens of megabytes or even gigabytes in some cases. Furthermore, the data often has to be transferred over large distances: e.g., a disaster recovery application may be configured to replicate data from a primary data center in the United States to another data center in Europe or Asia.

Much of the data for these bulk data transfers is often transferred at least in part over public networks such as the Internet, especially as budgetary pressures have reduced the ability of many enterprises to deploy proprietary high-speed networks and/or non-standard protocols. As a result, the network paths taken by the data packets corresponding to a given bulk data transfer often include a variety of network devices (e.g., switches, routers, etc.) and/or links over which the sending endpoint does not have control. In fact, the sending endpoint typically relies on a standard communication protocol (such as the Transmission Control Protocol/Internet Protocol (TCP/IP)) for routing packets and has very limited knowledge of the specific paths taken by the data packets on their way to the destination endpoint. The sending application simply hands over data packets as fast as possible to the networking software stack at the sending endpoint, and the networking software stack typically transfers the data as fast as possible to a hardware device (e.g., an Ethernet network interface card or NIC) connected to the network. The data packet sizes supported by the network hardware device are often relatively small compared to bulk data transfer sizes: e.g., in a typical implementation where the size of an Ethernet packet is limited to about 1500 bytes, a 64-kilobyte chunk of application data may be transferred as a burst of about 40 very closely spaced packets. The burst of packets may be followed by a gap (e.g., representing time needed by the application to transfer an additional chunk of data to the networking stack and/or to receive an application-level acknowledgment from the receiving endpoint), followed by another burst, and so on, until the bulk data transfer is eventually complete. As a result, the sending device for a given bulk data transfer often transmits data in a bursty pattern.

Due to the decentralized nature of most common network protocols, a given network resource such as a router or switch is often not aware of the application to which a particular data packet received by the device belongs. The network device does not distinguish between the packets of different data transfers: it simply sees sequences of incoming packets on each of its input ports, determines the next link on each packet's route by examining the packet header and sends the packet on over the next link using an appropriate output port. Often, network devices may have limited input and/or output buffer space: e.g., in some implementations, each port's input buffer on a network switch may be limited to buffering 40 packets at a time, and each port's output buffer may be limited to 70 packets. Because the network devices can participate in multiple concurrent data transfers, the bursty nature of the packet streams emitted by sending endpoints can sometimes temporarily overwhelm the resources of a network device, resulting in packets being dropped or lost. For example, if two bursts of more than twenty data packets each happen to arrive on the same port at a particular switch that can buffer at most forty packets in a given input buffer, some of the packets may be dropped. Similarly, if more than seventy packets need to be buffered for output from a given port whose output buffer capacity is limited to seventy packets at a time, some of the outgoing packets may be dropped. Such micro-congestion, even though it may only be a local and transient phenomenon, and even though the network as a whole may have a relatively low level of utilization, can have potentially far-reaching effects on the bulk data transfers, since networking protocols such as TCP/IP react to data packet loss by automatically throttling the data transfer, adjusting parameters such as window sizes and the like.

A number of different approaches to tuning network traffic have been considered. Some such schemes either require changes to standard network software stacks or require custom hardware; however, such schemes are difficult to implement in environments that rely on standards-based and interoperable communication technologies. Techniques that require substantial changes to legacy applications or third-party applications are also unlikely to be deployed in most enterprise environments. Other techniques attempt to implement global solutions that cannot adapt rapidly to changes in the current state of a given data flow: e.g., some schemes may attempt to statically partition bandwidth between different applications, but may still not be able to avoid the transient micro-congestion phenomena and the resulting problems described above.

SUMMARY

Various embodiments of systems and methods for preventing network micro-congestion using send pacing based on end-to-end bandwidth are disclosed. According to one embodiment, a system comprises one or more processors and memory coupled to the processors, wherein the memory comprises program instructions executable by the processors to obtain an estimate of end-to-end network bandwidth available to a particular application-level data transfer operation in progress over a network between a first endpoint and a second endpoint. Based at least in part on the estimate of end-to-end bandwidth, the instructions are further executable to introduce a delay between transmissions of two or more successive messages or packets of the particular application-level data transfer operation from the first endpoint. The instructions may be packaged, for example, as a user-mode traffic manager (e.g., a library) and/or in one or more kernel-mode traffic manager drivers in one embodiment. The delays may help to reduce burstiness in the outgoing traffic from the first endpoint, and match the sending transfer rate more closely to the bandwidth that is actually available for the application-level data transfer. As a result of the reduction in burstiness of the send traffic, the probability of transient congestion events (e.g., when a large number of packets arrive at the same port of a network device such as a switch, exceeding the available buffer space and potentially leading to dropped packets) in the network may be reduced. A reduction in transient congestion events (which may be termed "micro-congestion" herein) may in turn help to alleviate some of the problems that may otherwise be caused by self-adjusting flow control mechanisms used in common networking protocols, which may for example severely throttle a data transfer in response to dropped data packets.

The estimates of available bandwidth may be derived on a per-connection basis in real-time in some embodiments, for example using user-mode instrumentation that does not require modifications to application code, operating system code or networking protocol stack code. The delays between successive packets may be introduced at any of various layers of the software stack at the sending endpoint in various embodiments: e.g., in one embodiment, delays may be introduced before application data is passed from user space into kernel space, while in another embodiment, delays may be introduced in kernel space, just before the packets are transferred to networking hardware. The duration of the delays may be calculated in some embodiments to set the sending data rate close to the estimated available bandwidth. For example, if the available bandwidth is estimated to be 10 Megabits/second and the application is ready to send data in bursts of 20 Megabits/second, the traffic manager may introduce delays to reduce the actual send rate to slightly less than 10 Megabits/second.

In some embodiments, trends in available bandwidth may be detected by the traffic manager, and the delays to be used for subsequent packets of the ongoing data transfer may be adjusted accordingly. In one embodiment, different delays may be introduced into concurrent data transfers originating from the same application. Data transfers performed on behalf of a wide variety of applications may be "shaped" or "paced" introducing task-specific delays in various embodiments, including storage management applications, telecommunication/telephony applications, media applications, etc. In one embodiment, user-specified parameters may be used to control various aspects of the data shaping, such as how closely the send rate should approach the estimated available bandwidth.

Figure 1:
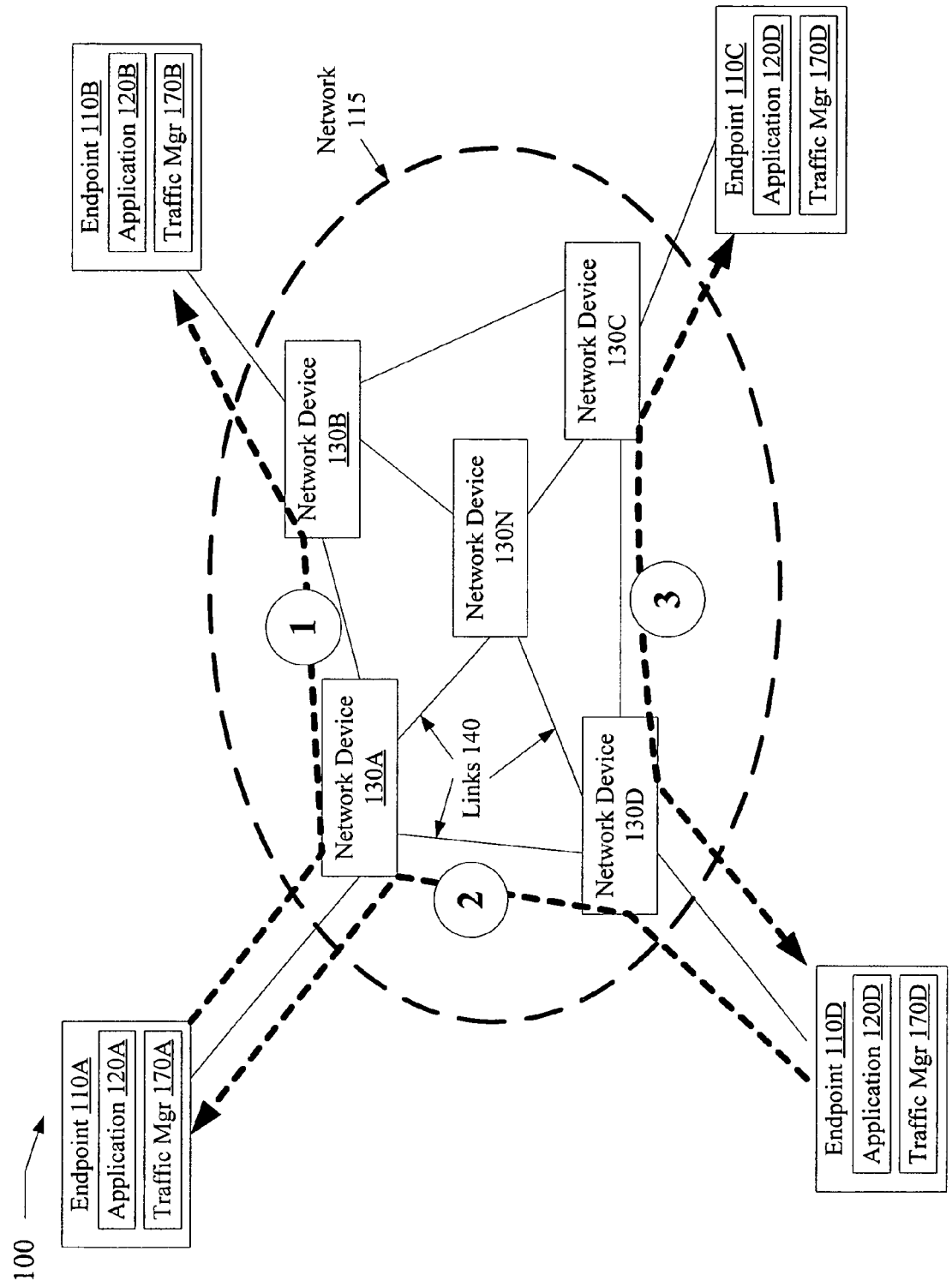
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 comprising a plurality of network endpoints 110 (e.g., endpoints 110A-110D) linked to a network 115 that includes a plurality of network devices 130 (e.g., network devices 130A-130N). An endpoint 110 may include any of a wide variety of devices, such as computer servers, desktops, laptops, personal digital assistants, mobile telephony devices, television set-top boxes, audio receivers, etc., that are configured to support applications 120 (e.g., application 120A at endpoint 110A, application 120B at endpoint 120B, and so on) that require network access and perform at least some bulk data transfers over the network. A wide variety of applications 120 may be supported at endpoints 110 in different embodiments, including storage management applications (e.g., distributed file systems, backup/restore, replication, and disaster recovery applications), telephony and other telecommunication applications (e.g., voice over IP), media servers, bioinformatics applications, distributed simulation applications, geographically distributed software development projects, etc. Traffic managers 170 (e.g., traffic manager 170A at endpoint 110A, traffic manager 170B at endpoint 170B, etc.) may be configured to insert delays between successive packets of a bulk data transfer based at least in part on estimates or measurements of available end-to-end bandwidth for the bulk data transfer, as described below in further detail. Network devices 130 may include switches, routers, gateways, and any other devices that participate in or help manage transmission of data within the network 115. Any of a variety of networking technologies (e.g., Ethernet, Asynchronous Transfer Mode (ATM), Fibre Channel, etc.) and corresponding software and/or hardware protocols may be used singly or in combination within network 115 in various embodiments. The term "bulk data transfer", as used herein, refers to a transfer of data on behalf of a specific application task, such as a transfer of a requested video or audio file, or a backup of a specified source data set, where the amount of data to be transferred for the task is sufficiently large that the data is typically transmitted in the network using multiple packets or messages. The terms "application task" and "application job" may be used herein to refer to a unit of work performed using an application, for example work performed in response to a single request initiated by a user or by another application. The terms "packet", "network message" and "message" may be used herein generally to refer to units in which data and/or control information is transmitted over the network 115; the specifics of how packets or messages are organized internally may vary from protocol to protocol and from network type to network type in various embodiments. As viewed from a network device 130, incoming and outgoing traffic streams may comprise packets from a variety of bulk data transfers (as well as packets corresponding to short, non-bulk communications) mingled together; typically, a network device may not be able to distinguish packets of one data transfer from those of another. Often, a single bulk data transfer for a single application task may comprise sending hundreds or thousands of data packets from one endpoint 110 to another.

The broken arrows labeled "1", "2" and "3" in FIG. 1 illustrate three exemplary bulk data transfers. In the bulk data transfer labeled "1", data is transferred on behalf of a task performed using application 120A at endpoint 110A to application 120B at endpoint 110B. In the bulk data transfer labeled "2", data is transferred on behalf of a task of application 120D at endpoint 110D to application 120A at endpoint 110A. Some bulk data transfers, such as the transfer labeled "3", may be bidirectional: e.g., for a given application task, multiple network messages or packets collectively containing large amounts of application data may be sent from endpoint 110D to endpoint 110C and from endpoint 110C back to endpoint 110D. It is noted that even for data transfers that are largely unidirectional with respect to application data, such as a transfer of a 100-Megabyte backup data set from a primary site to a secondary site, network packets may be transmitted in both directions: e.g., while packets containing the application data may be transmitted only from the sending endpoint (the primary site in the backup example) to the receiving endpoint (the secondary site), acknowledgement packets and/or other control packets may be transmitted in the reverse direction. For bidirectional bulk data transfers, each endpoint may serve as a sending endpoint as well as a receiving endpoint. A given bulk data transfer may use multiple network devices 130 and multiple network links 140. In some embodiments, a single application 120, such as application 120D, may receive and/or send data corresponding to multiple data transfers, often concurrently. Some of the applications 120 may be distributed across multiple endpoints 110, and bulk data transfers may be performed from one component of a distributed application to another. For example, in FIG. 1, endpoint 110A may represent a primary site whose data is to be backed up to a secondary site at endpoint 110B, and applications 110A and 110B may respectively represent primary-site and secondary-site components of a distributed backup application.

Subsets of the endpoints 110 and network devices 130 shown in FIG. 1 may be administered or controlled by different organizations in some embodiments. For example, in one embodiments, endpoint 110A may be a video server managed by a media company, while endpoint 110B may be a home computer owned by a customer of the media company, and the network devices 130 participating in a bulk data transfer of a video file from endpoint 110A to endpoint 110B may be owned and controlled by one or telecommunication companies. In general, no single entity may have complete control over the endpoints 110 and/or the network devices 130 involved in a given data transfer. The sending and receiving endpoints 110 may be unaware of the specific path taken by packets of a bulk data transfer, and the paths taken by different packets of a given bulk data transfer may differ.

In one embodiment, a traffic manager 170 at an endpoint 110 may be configured to obtain estimates or measurements of the actual end-to-end bandwidth available for a given bulk data transfer while the transfer is still in progress. The estimates or measurements may be obtained from a variety of sources in different embodiments, such as an application participating in the bulk data transfer, instrumentation inserted into the packets of the transfer by the traffic manager or by some other entity, third-party network performance tools, etc. The term "end-to-end bandwidth", as used herein, refers to the rate at which data associated with the bulk data transfer is transmitted from one endpoint 110 to another endpoint, taking the entire network path between the endpoints into account. It is noted that the end-to-end bandwidth, as measured at a given endpoint 110, may differ from the advertised or achieved bandwidth at individual components of the network path between endpoints. For example, an Ethernet network interface card used to transmit the data from endpoint 110A may have an advertised bandwidth of 100 Megabits/second or 1 Gigabit/second; various network devices, such as switches, may offer advertised aggregate bandwidths of several Gigabits/second; and links 140 may each have their own associated advertised bandwidth capacity. The actual bandwidth achieved from endpoint to endpoint may be substantially less than the advertised bandwidth of even the slowest device or link of the network path for a variety of reasons in different implementations. In some embodiments, several of the network devices 130 and/or links 140 may be shared among multiple tasks of a given application 120, between multiple applications 120, and/or between multiple endpoints 110. Concurrent use of the devices 130 may result in queuing and/or packet collisions at various points along the path, depending on the specific implementations of the devices 130 and the networking protocol or protocols in use. Furthermore, because of the nature of some of the networking protocols that may be employed in network 115, the loss of even a few packets may result in a substantial slowdown for a given data transfer. Protocols of the TCP/IP (Transfer Control Protocol/Internet Protocol) family may, for example, automatically adjust parameters (such as by reducing send window sizes, increasing retransmit timeout values, etc.) in response to dropped packets, under the assumption that the loss of a packet is an indicator of congestion or a faulty network. Even if the packet loss is caused by a transient phenomenon rather than a sustained phenomenon, as described below in conjunction with the example data traffic illustrated in FIG. 3, and the network quickly recovers from the transient phenomenon, the adjustment of the protocol parameters may tend to throttle the data transfer at least for a while. While the parameters may eventually be reset to values that allow higher transfer rates if packet loss does not reoccur, it often takes a while for the parameters to return to the appropriate settings. As a result, the measured end-to-end throughput is often lower than the advertised throughput: for example, measured throughput for a given application task on a one Gigabit/second network may be as low as 50 Megabits/second.

A traffic manager 170 may in one embodiment use real-time measurements or estimates of the end-to-end bandwidth for a data transfer to shape the remaining outbound traffic of the data transfer from an endpoint 110, e.g., by inserting delays between successive packets to reduce the burstiness of the outbound traffic on a per-connection level as described below in further detail. The insertion of delays into the outbound packet stream may also be referred to herein as "pacing" or "send pacing". As a result of the introduced delays, the likelihood of temporary congestion at one or more network devices 130 may be reduced. The reduction in burstiness, and the accompanying reduction in congestion, may actually allow the traffic manager to gradually reduce the delays between packets, thereby potentially achieving a higher bandwidth than was possible before the delays were introduced, leading to a reduction in the total time taken to complete the data transfer and the corresponding application task. At the same time, the introduction of delays between packets may also have indirect beneficial effects in some embodiments on other applications that may or may not have their own associated traffic managers. For example, the delays introduced in one application's outbound traffic may lead to a reduction in packet loss and/or retransmission rates of other data transfers of other applications, thus potentially reducing the protocol-initiated throttling effects that may affect the other data transfers as well.

Figure 2:
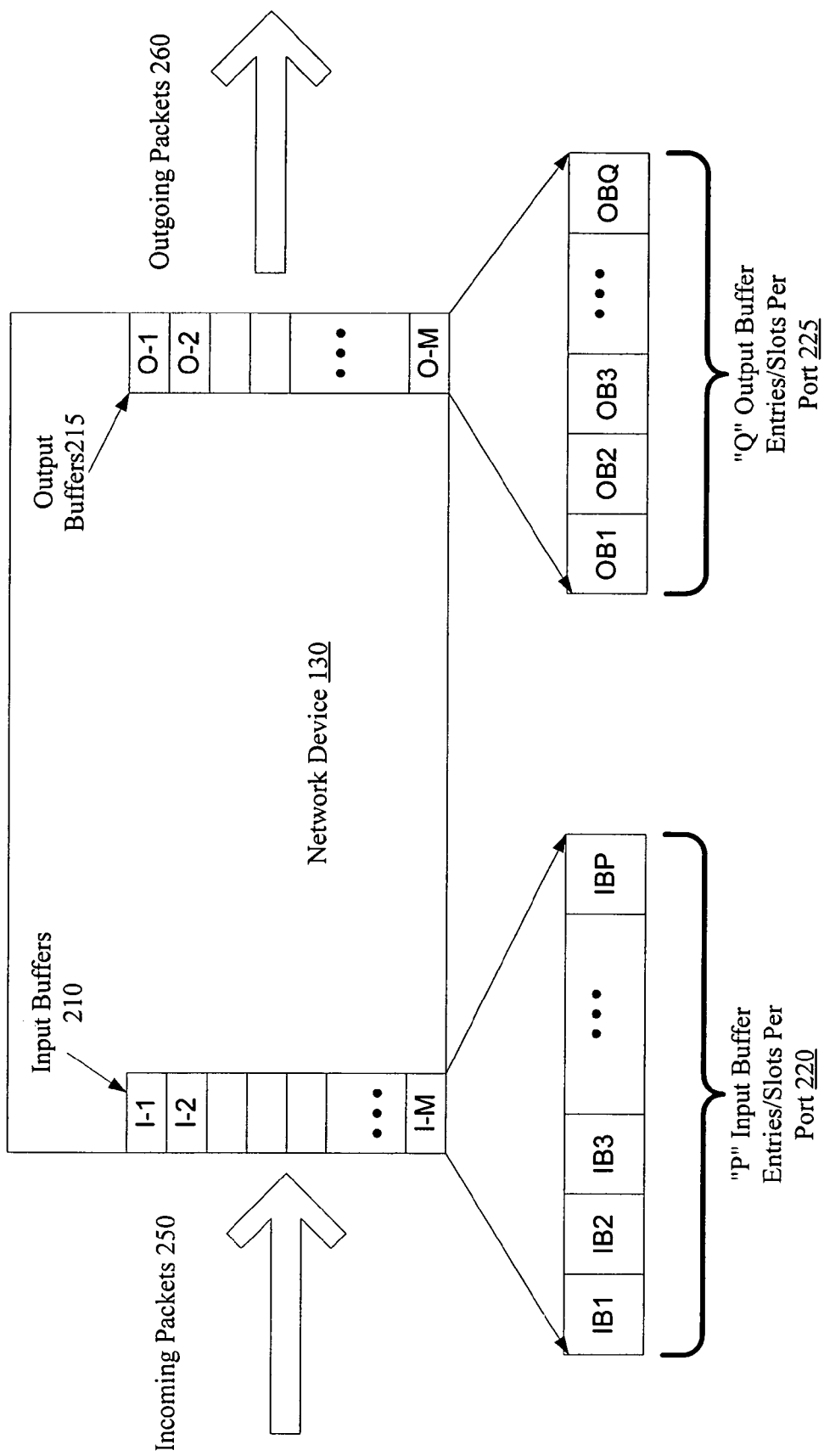
FIG. 2 is a block diagram illustrating a subset of the constituent elements of an exemplary network device, according to one embodiment.

FIG. 2 is a block diagram illustrating a subset of the constituent elements of an exemplary network device 130, according to one embodiment. The network device 130 may, for example, be a switch, a router, or any other device that forms part of a path taken by packets of a bulk data transfer. The network device 130 may include a plurality of ports, which may be bidirectional (i.e., each port may be used for both input and output) in some embodiments. Corresponding to each port of the network device, the network device may include an input buffer 210 (such as input buffer I-1 for port 1, input buffer I-2 for port 2, etc.) as well as an output buffer 215 (such as output buffer O-1 for port 1, output buffer O-2 for port 2, etc.). An input or output buffer for a given port may include sufficient storage for a plurality of packets—e.g., there may be "P" slots 220 per input port (shown as slots IB-1-IB-P in FIG. 2), and there may be "Q" slots 230 per output port (shown as slots OB-1-OB-Q), where each slot may be capable of storing a packet or a specific amount of message-related data. It is noted that in some implementations, the storage for input and output buffers may not be explicitly divided into slots 220 or 230; instead, portions of a fixed pool of buffer storage may be dynamically designated to store incoming and/or outgoing packets as needed. In some embodiments, overflow buffers for input and/or output may also be implemented in addition to the buffers shown in FIG. 2. In addition to the buffers illustrated in FIG. 2, network device 130 may include several other components, including one or more processors, memory linked to the processors, etc., that are not shown in FIG. 2. An incoming data packet 250 may be buffered if needed in a port's input buffer, processed (e.g., a header of the packet may be read to identify the specific output port through which the packet should be directed), possibly buffered for output, and then transmitted into the network. Depending on the distribution of incoming traffic over time and manner in which the incoming traffic happened to be spread across the input ports 210, network device 130 may experience a buffer shortage at one or more input buffers from time to time in some embodiments. For example, if each slot in a buffer is configured to store one packet, if P slots are available for a particular port, and if more than P packets happen to arrive at the particular port very close together in time, the network device 130 may not be able to accommodate all the incoming packets in the input buffers for that port. In fact, in some implementations, the excess packets for which input buffer slots are not available may simply be dropped by the network device 130, without even indicating that an error occurred; the network device 130 in such implementations may simply rely on the networking protocols and/or applications to respond appropriately to dropped packets, e.g., by retransmitting the dropped packets. Similar buffer shortages may also occur at output buffers as well: for example, if each output port buffer slot 230 holds one packet, a maximum of Q slots are available per port for output, and more than Q packets (possibly from multiple input data streams) are to be output from a single port at about the same time, one or more of the outbound packets corresponding to that port may have to be dropped. Such buffer shortages or overruns represent examples of micro-congestion or transient congestion that may be caused by bursty incoming traffic patterns and/or by routing coincidences (e.g., when large numbers of packets happen to be routed to the same port for output during short periods of time), even when the overall utilization of the network device and the network as a whole when measured over a period of time is not very high. For example, packet loss rates on the order of one percent caused largely by micro-congestion have been observed in some network implementations, even when the sustained utilization of the network is as low as 30%. Even packet loss rates lower than one percent can have significant impacts on bulk data transfer throughput, however, e.g., as a result of the automatic throttling of traffic by network protocols described above.

Figure 3:
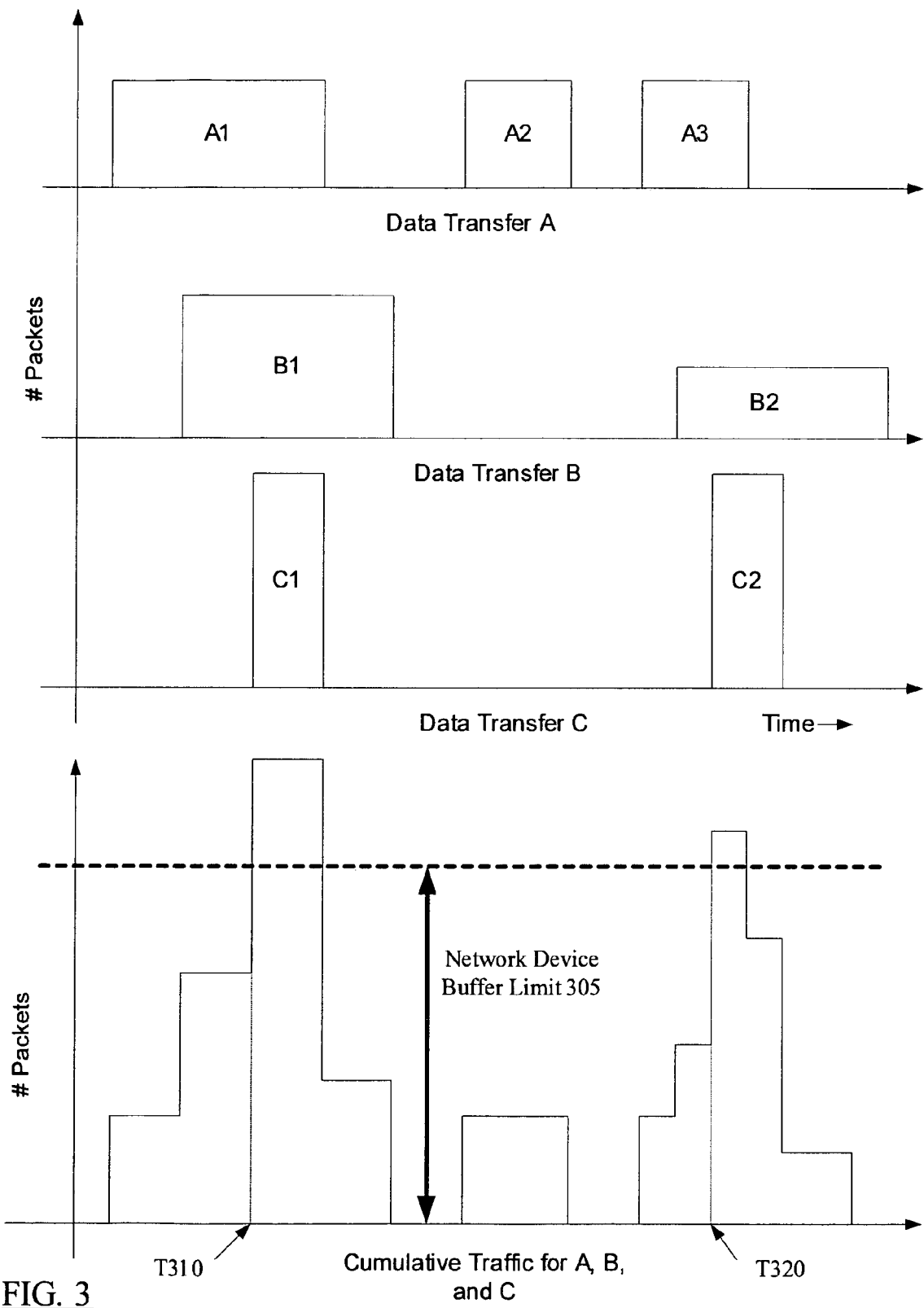
FIG. 3 illustrates exemplary time distributions of packets sent for three data transfers, and a resulting buffer overrun at a network device, according to one embodiment.

In some embodiments, the bursty nature of the traffic generated by sending endpoints 110 involved in bulk data transfers may be a significant cause of micro-congestion at a network device 130. FIG. 3 illustrates exemplary time distributions of packets sent for three bulk data transfers A, B and C, and how the combination of the traffic for the three data transfers may result in a buffer overrun at a network device 130, according to one embodiment. Data transfer A includes a transmission of three separate bursts A1, A2 and A3 of data packets, separated by time periods in which A does not transmit any data. Similarly, data transfer B includes bursts B1 and B2, while data transfer C includes bursts C1 and C2. Time (i.e., time at which the packets are received at a network device 13) progresses from left to right in FIG. 3, and the height of the bursts is indicative of the number of packets in the bursts. The burstiness of the traffic illustrated in FIG. 3 may be caused, for example, by the sending application 120 for each of the data transfers A, B and C may simply handing over data packets as fast as possible to the networking software stack at the sending endpoint 110. The networking software stack typically transfers the data as fast as possible to a network interface card connected to the network 115. The data packet sizes supported by the network hardware device are often relatively small compared to bulk data transfer sizes: e.g., in a typical implementation where the size of an Ethernet packet is limited to about 1500 bytes, a 64-kilobyte chunk of application data may be transferred as a burst of about 40 very closely spaced packets. The gaps between successive bursts may, for example, indicate time needed by the sending application 120 to transfer an additional chunk of data to the networking stack and/or to receive an application-level acknowledgment from the receiving endpoint 110.

In the example illustrated in FIG. 3, the packets for each of the data transfers A, B and C are assumed to be directed to a single port of a network device 130. The cumulative impact of the bursty traffic of data transfers A, B, and C at the network device 130 is illustrated in the lower portion of FIG. 3, where a dashed horizontal line indicates a buffer limit 305 (e.g., a maximum storage capacity of an input buffer 210) for the port at which the data for the three transfers is received. At times T310 and T320, the cumulative number of packets for the three data transfers A, B and C exceeds the number of packets that can be simultaneously buffered, and as a result some of the packets may be dropped, potentially leading to a reduction in data transfer throughput as described earlier. A similar impact may occur on output as well: e.g., if the output buffer capacity limit is exceeded on a given port, one or more packets may be dropped instead of being transmitted from the network device.

Figure 4:
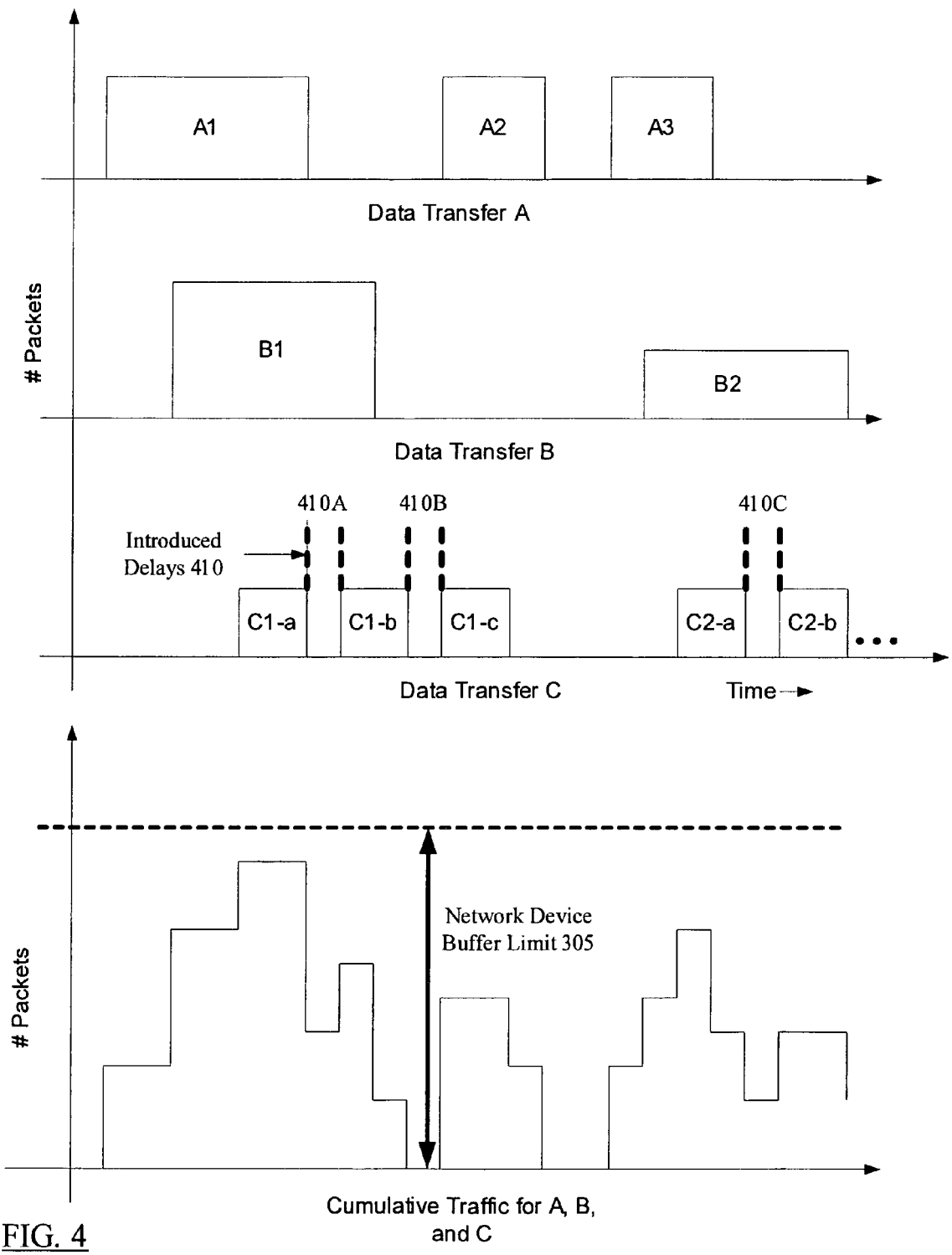
FIG. 4 illustrates an exemplary modification to a traffic distribution over time corresponding to a data transfer of FIG. 3, according to one embodiment.

FIG. 4 illustrates an exemplary modification to the traffic distribution over time corresponding to data transfer C of FIG. 3, according to one embodiment. Traffic manager 170 at the sending endpoint 110 from which data transfer C originates may be configured to measure or estimate the end-to-end network bandwidth available for data transfer C, e.g., based on instrumenting the packets of data transfer C as described below in further detail. Using the estimate of available end-to-end bandwidth obtained earlier than the time at which packets corresponding to bursts C1 and C2 of FIG. 3 are available for transmission, traffic manager 170C may be configured to determine a delay to be introduced between some of those packets. For example, the packets corresponding to C1 may be split into three packet groups C1-$a$, C1-$b$, and C1-$c$, where the C1-$a$ packets are transmitted from the sending endpoint as soon as they are available, the C1-$b$ packets are transmitted after a delay 410A after C1-$a$ packets have been sent, and C1-$c$ packets are transmitted after a delay 410B after C1-$b$ packets have been sent. Similarly, packets corresponding to burst C2 of FIG. 3 may be split into two packet groups C2-$a$ and C2-$b$ that are sent with an intervening delay 410C. The result of the introduction of delays at the sending endpoint are illustrated in the lower portion of FIG. 4, where the network device does not experience the type of buffer overrun that was illustrated in FIG. 3. It is noted that while only one of the three data transfers has been modified in FIG. 4, a further "smoothening" of the cumulative traffic may be achieved if delays were also introduced into one or both of the remaining data transfers A and C.

The duration of the delays 410 (e.g., 410A, 410B and 410C) may be computed by traffic manager based on the estimate or measurement of end-to-end throughput in some embodiments. In other embodiments, in response to detecting that the end-to-end throughput is lower than a threshold, a default initial delay (e.g., 10 milliseconds between every Ethernet packet) or a random delay (e.g., a delay randomly selected between 1 and n milliseconds, where n may be a parameter provided to the traffic manager) may be introduced into the data transfer. After delays are introduced into an outbound data transfer, a traffic manager 170 may continue to monitor the available end-to-end bandwidth for the data transfer in one embodiment, e.g., to determine trends in the available bandwidth. The traffic manager 170 may increase or decrease the delay durations for future packets of the same data transfer based on the trends. For example, if a traffic manager introduced delays that limit the achievable throughput for a given data transfer to 50 Megabits/second, and the measured throughput remains approximately 50 Megabits/second for a specified period after the delays are initially introduced, the traffic manager 170 may decrease the delay duration to determine whether conditions in the network may allow a higher throughput. In contrast, in one implementation, if the maximum achievable throughput after an introduction of a delay is 50 Megabits/second, and the observed throughput over a period drops down to 20 Megabits/second, the traffic manager 170 may increase the delay duration. In some embodiments, using real-time measurements of available bandwidth or achieved throughput, the traffic manager may adjust to changing conditions in the network fairly rapidly while reducing the likelihood of micro-congestion at the network devices 130.

It is noted that limited buffer capacity at one or more network devices 130 as illustrated in FIG. 2-FIG. 4 may represent just one of many different possible sources of micro-congestion. In some embodiments, for example, micro-congestion may be caused by a misconfiguration of a network device, by a transient bug in software at a network device, and/or as a result of a large number of packets that legitimately happen to be directed to a given port or device at about the same time. The adaptive introduction of delays in outbound traffic as described above based on an estimate or measurement of end-to-end available bandwidth may help to alleviate the negative effects of micro-congestion independent of the specific source of the micro-congestion in different embodiments.

Figure 5:
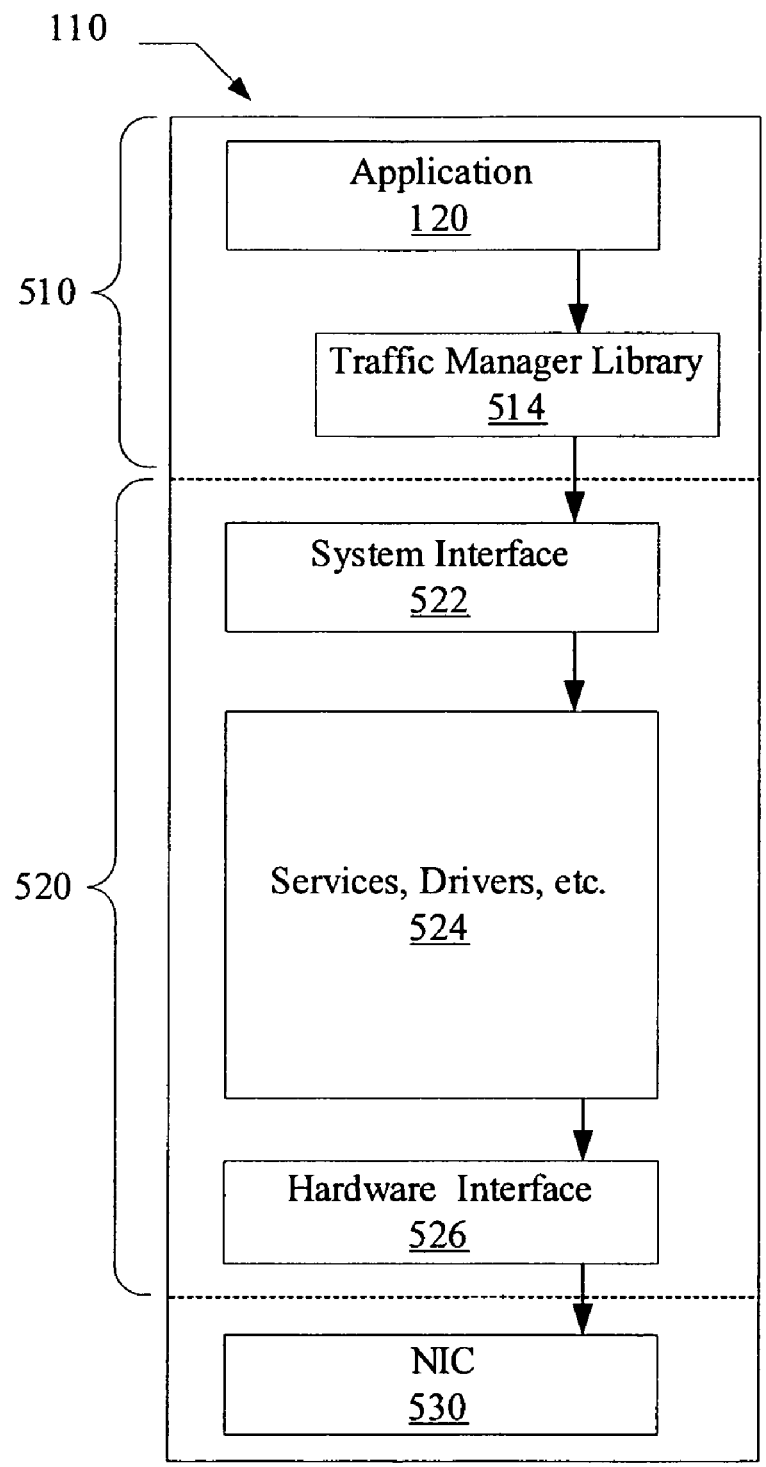
FIG. 5 is a block diagram illustrating an abstracted view of a sending endpoint showing various hardware and software components, according to one embodiment.

In some embodiments, one or more components of a traffic manager 170 may be implemented at various levels of a software stack at an endpoint 170. FIG. 5 is a block diagram illustrating an abstracted view of a sending endpoint 110 showing various hardware and software components, with the software components operating within either a user space 510 or a kernel space 520, according to one embodiment. In the illustrated embodiment, the endpoint 110 may be configured to support communications using TCP/IP. Alternative embodiments may support other communication protocols in addition to TCP/IP or instead of TCP/IP.

In the embodiment shown in FIG. 5, the user space 510 may include application 120 and a traffic manager library 514 implementing the functionality of traffic manager 170. For example, traffic manager library 514 may be configured to instrument packets of data generated for transmission on network 115 to estimate or measure available end-to-end bandwidth, and/or to insert delays between successive packets or successive groups of packets as they are passed from application 120 in user space 510 into the kernel space 520. Generally speaking, while multiple applications 120 and traffic manager libraries 514 may be included in a given endpoint 110, only a single application 120 and library 514 are shown for ease of discussion. In one embodiment, traffic manager library 514 may comprise a dynamically linked library (DLL) that includes code to support network communications. In one embodiment, library 514 may be loaded prior to a communication socket library on a per process basis. For example, library 514 may provide an Application Programming Interface (API) for accessing communication services provided by the operating system, such as a modified version of a socket API that is invoked in lieu of the original socket API included in the operating system. While the term "library" is used herein to refer to software component 514, this term is not intended to restrict the traffic manager to a particular type of software component. For example, as described above, library 514 may be a DLL. However, the functions performed by the code within the library may be performed by code within the application 120 itself, in a different software component, or elsewhere.

Kernel space 520 may include a system interface 522, services 524, and hardware interface 526. System interface 522 may provide an interface between the operating system services 524 and application code within the user space 510. Services 524 may include, for example, protocol stacks, drivers, and other facilities commonly found in an operating system. Hardware interface 526 may include code that provides an interface between the operating system and hardware components of the endpoint 110, such as NIC 530. Outbound traffic corresponding to a given task of application 120 originates at the application 120, and proceeds down the layers of components illustrated in FIG. 5 on its way to network 115. Various operations may be performed on the traffic as it flows down the stack. For example, traffic manager library 514 may instrument data packets generated by the application and/or insert delays between successive application packets prior to transferring the application data to the kernel layer 520. The data packets may be buffered at various software layers and/or at the NIC 530, and packet headers may be added or modified at various layers as well in accordance with the specific networking protocol in use. Software and hardware components similar to those illustrated in FIG. 5 may be present at the receiving endpoint of the data transfer, where the incoming packets may be handed up the stack until the data reaches a receiving application. The receiving endpoint may also include a traffic manager library 514. The receiving traffic manager library may be configured to manage outbound bulk data transfers from the receiving endpoint, and may also be configured to cooperate with the sending endpoint's traffic manager library, e.g., to include timestamps in packets sent back to the sending endpoint to help measure or estimate end-to-end available bandwidth.

Figure 6:
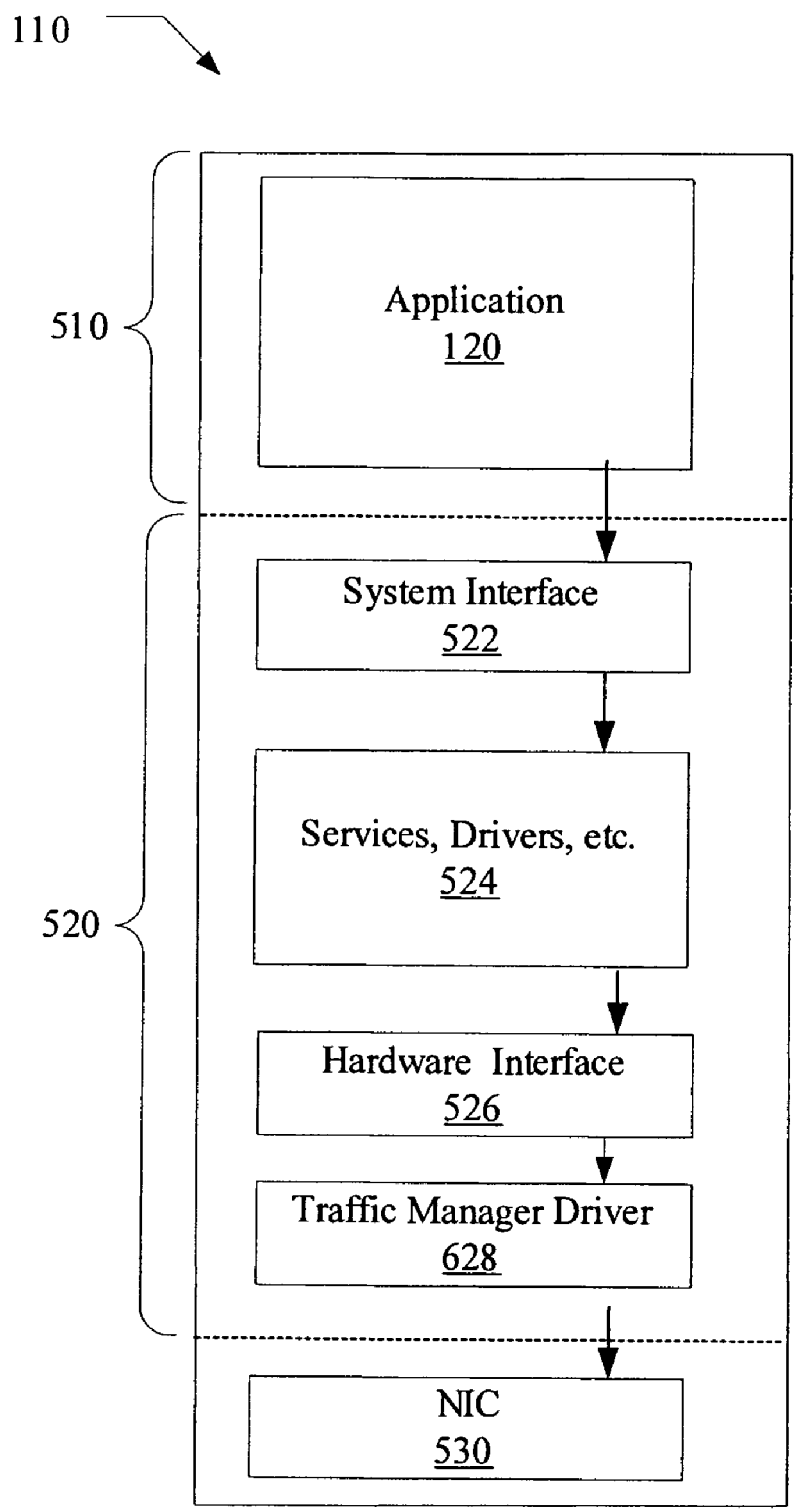
FIG. 6 is a block diagram illustrating various components of a sending endpoint according to an embodiment in which a kernel-space traffic manager driver implements at least part of the functionality of a traffic manager.

In the embodiment illustrated in FIG. 5, the functionality of traffic manager 170 may be accomplished entirely in user space, without affecting either the kernel space software stack (including a networking software stack) or the application 120. For example, available bandwidth estimation may be performed in user space, and delays may be introduced between packets in user space without requiring any modifications to the application code or the operating system. Thus, the traffic managers 170 may be platform-independent in such embodiments; for example, the sending and receiving endpoints may use different operating systems and/or different computer architectures. In alternative embodiments, at least some of the functionality of traffic manager 170 may be implemented in kernel space. FIG. 6 is a block diagram illustrating various components of a sending endpoint 110 according to an embodiment in which a kernel-space traffic manager driver 628 implements at least part of the functionality of traffic manager 170. Several of the components of endpoint 110 shown in FIG. 5 are present in FIG. 6 as well, such as application 120, system interface 522, services and drivers 524, hardware interface 526 and NIC 530. In one embodiment, traffic manager driver 628 may be configured to receive an estimate of available end-to-end bandwidth, or to compute end-to-end bandwidth corresponding to a given data transfer in progress, and to introduce delays between packets of the data transfer before the packets are transferred to the NIC 530. As in the case of the embodiment of FIG. 5, no code changes may be required in the application or in the operating system or networking stack to implement the functionality of traffic manager driver 628 in some embodiments. A similar traffic manager driver 628 may be included at receiving endpoints 110 in some embodiments. Traffic manager driver 628 of FIG. 6 may be configured to transparently shape outbound traffic for a plurality of applications 120 in such embodiments, without, for example, requiring each application 120 to separately invoke traffic manager components at the user level. It is noted that while FIG. 5 and FIG. 6 illustrate two exemplary layers of an endpoint's software stack at which functionality of traffic manager 170 may be implemented, in other embodiments traffic manager functionality may be implemented at any layer or at any combination of various layers of an endpoint software stack. In one embodiment, kernel-level and user-level components of traffic manager 170 may coexist at the same endpoint, and the different components may be configured to cooperatively perform the functionality of the traffic manager. For example, in one implementation, end-to-end available bandwidth may be measured performed by a user-level traffic manager component using user-level instrumentation or external network performance tools, while delays between successive packets may be introduced by a kernel level traffic manager driver.

Figure 7:
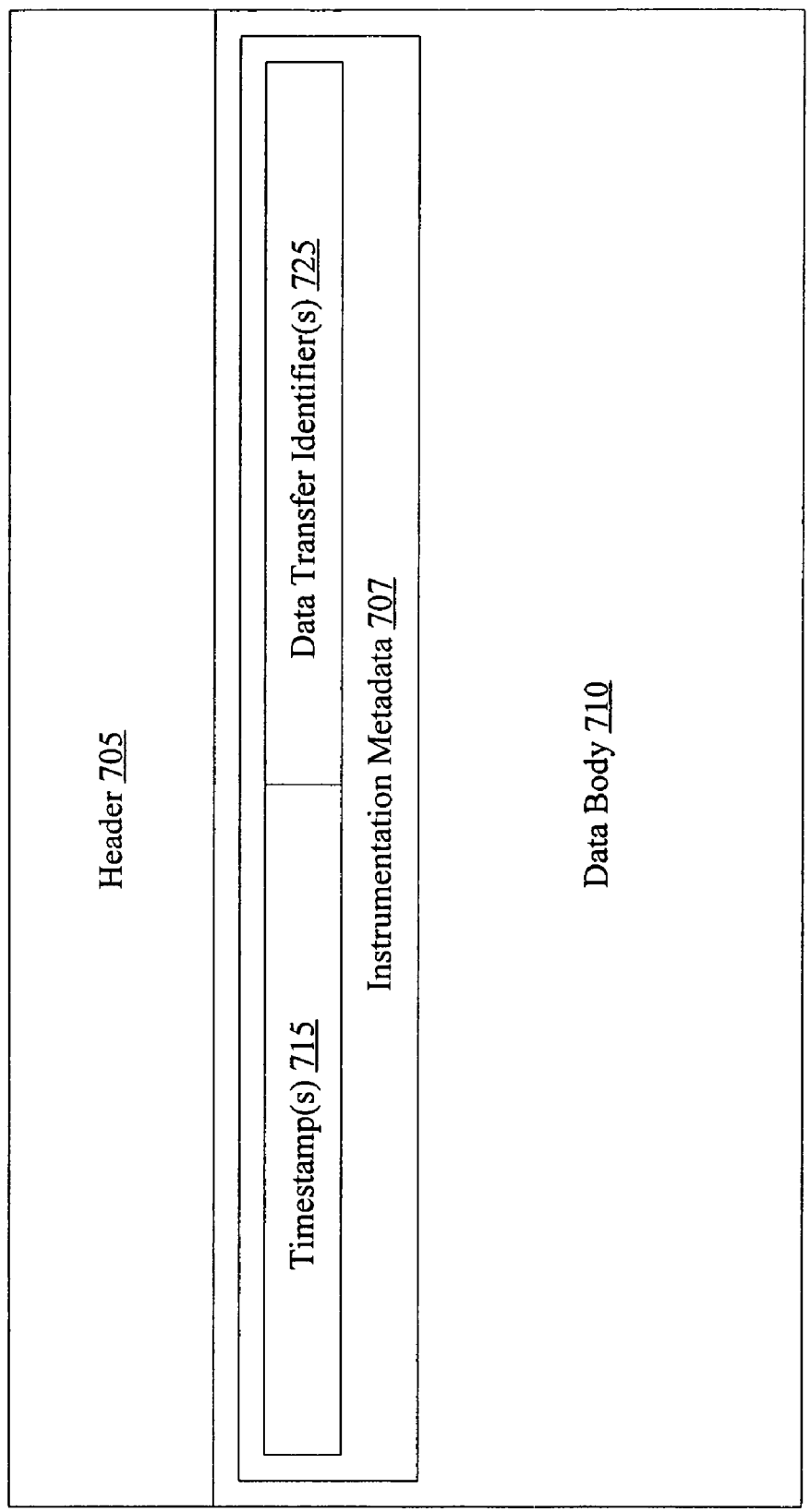
FIG. 7 is a block diagram illustrating contents of an exemplary network packet instrumented by a traffic manager, according to one embodiment.

In one embodiment, a traffic manager 170 may be configured to insert timestamps and/or data transfer identifiers into the packets of a data transfer, e.g., in order to obtain estimates of the network bandwidth available for the data transfer. FIG. 7 is a block diagram illustrating contents of an exemplary packet 701 instrumented by a traffic manager 170, according to one embodiment. As shown, the packet 701 may comprise a header 705 and a data body 710. The header 705 may comprise a number of fields, such as a destination address, a checksum, etc., that may for example be generated by various layers of a networking software stack. The data body 710 may include a portion of the application data corresponding to the data transfer, as well as instrumentation metadata 707 comprising one or more timestamps 715 and data transfer identifiers 725 inserted by a traffic manager 170. In some implementations, the instrumentation metadata 707 may be inserted into an otherwise unused portion of the packet (such as a padding region used to ensure that the packets have a minimum or standard size according to the networking protocol being used). A data transfer identifier 725 may be used to uniquely identify a given data transfer, e.g., to help separately monitor the performance achieved for each data transfer. For example, packets corresponding to a data transfer of a video file to a particular client of a media server may include a first data transfer identifier, while packets corresponding to a data transfer of another video file to another client may include a second data transfer identifier. In one embodiment, a traffic manager 170 at a sending endpoint (which may be referred to herein as a "sending traffic manager") may be configured to generate a new unique identifier for each application task that is initiated, and use the generated identifier to identify the data packets corresponding to the application task. In some embodiments, the sending traffic manager may insert a timestamp 715 (indicating the current time at the sender) and/or the data transfer identifier 725 into the data body 710 at the time that the data of the packet 701 is transferred from user space to kernel space, while in other embodiments, the timestamp and/or identifier may be inserted at other times during the passage of the packet down the sending endpoint's software stack (e.g., just before the packet is transferred to a NIC). In one embodiment, a traffic manager 170 at a receiving endpoint (referred to herein as a "receiving traffic manager") may be configured to send a receive timestamp indicating when the packet is received at the receiving endpoint, along with the original timestamp and the data transfer identifier back to the sending traffic manager (e.g., as part of a data body of an acknowledgement packet sent from the receiving endpoint). Using the receive timestamp, the original timestamp, and the data transfer identifier, the sending traffic manager may be able to compute an estimate of the bandwidth currently available for the outbound data transfer. Using an indication of the current time when the receive timestamp reaches the sending endpoint, the sending traffic manager may also be able to estimate the current inbound bandwidth available, and use this estimate to compute and introduce delays into the outbound packet stream in accordance with the available bandwidth and/or with trends identified in the available bandwidth over time. In some embodiments, the traffic manager 170 at a sending endpoint may be configured to synchronize clocks with a traffic manager at a receiving endpoint in order to ensure that the timestamps 715 provided by both sides of the data transfer provide accurate indications of the time taken to transfer a packet.

A number of variations of the basic timestamp-based technique described above may be used in various embodiments. For example, in one embodiment, only a subset of the packets may be instrumented: e.g., every fifth packet or every tenth packet may be instrumented by the sending traffic manager 170, and corresponding acknowledgements from the receiving traffic manager may be used to estimate the currently available bandwidth. In another embodiment, instead of modifying packets that contain application data, the sending side traffic manager 170 may send special diagnostic packets from time to time to the receiving endpoint to help estimate the available bandwidth. The special diagnostic packets may not contain application data in some embodiments: instead, the data bodies of the diagnostic packets may contain, e.g., control information about the data transfer and or padding inserted to make the packet reach a desired size. In one implementation, instead of sending a receive timestamp in an acknowledgment, the receiving traffic manager may send its estimates of the transmission time for the packet and or its estimates of the available bandwidth back to the sending traffic manager. The instrumentation metadata 707 may in some embodiments include different fields than those shown in FIG. 7: e.g., in one implementation, additional fields such as sequence numbers may be included in the metadata, while in other implementations, data transfer identifiers may be omitted, and the traffic managers may use information contained in the protocol-specific headers 705 to map packets to application tasks.

In some embodiments, e.g., in order to ensure that its estimates of available bandwidth are not skewed by outlying data points, the sending traffic manager may be configured to generate an average value for the available bandwidth using instrumentation data corresponding to several packets. In one implementation, for example, the sending traffic manager may be configured to compute a running average of a specified number of packet transmission times, and use this average to update its estimate of available bandwidth. A user-specified or application-specified parameter may, for example, direct the traffic manager to use at least N data points in computing available bandwidth and/or the delays to be inserted into the outgoing packet stream. In one embodiment, the sending traffic manager may be configured to store historical performance data, e.g., indicating respective trends in packet transmission times, estimated bandwidth and introduced inter-packet delay durations over time. The historical performance data may be used to adjust delays introduced in the outbound packets to changing network conditions: e.g., if the historical performance data indicates that network congestion is generally easing over time, the sending traffic manager may decrease the duration of the delays introduced between the outbound packets and monitor the resulting packet transmission times to determine whether a higher throughput is sustainable.

Figure 8:
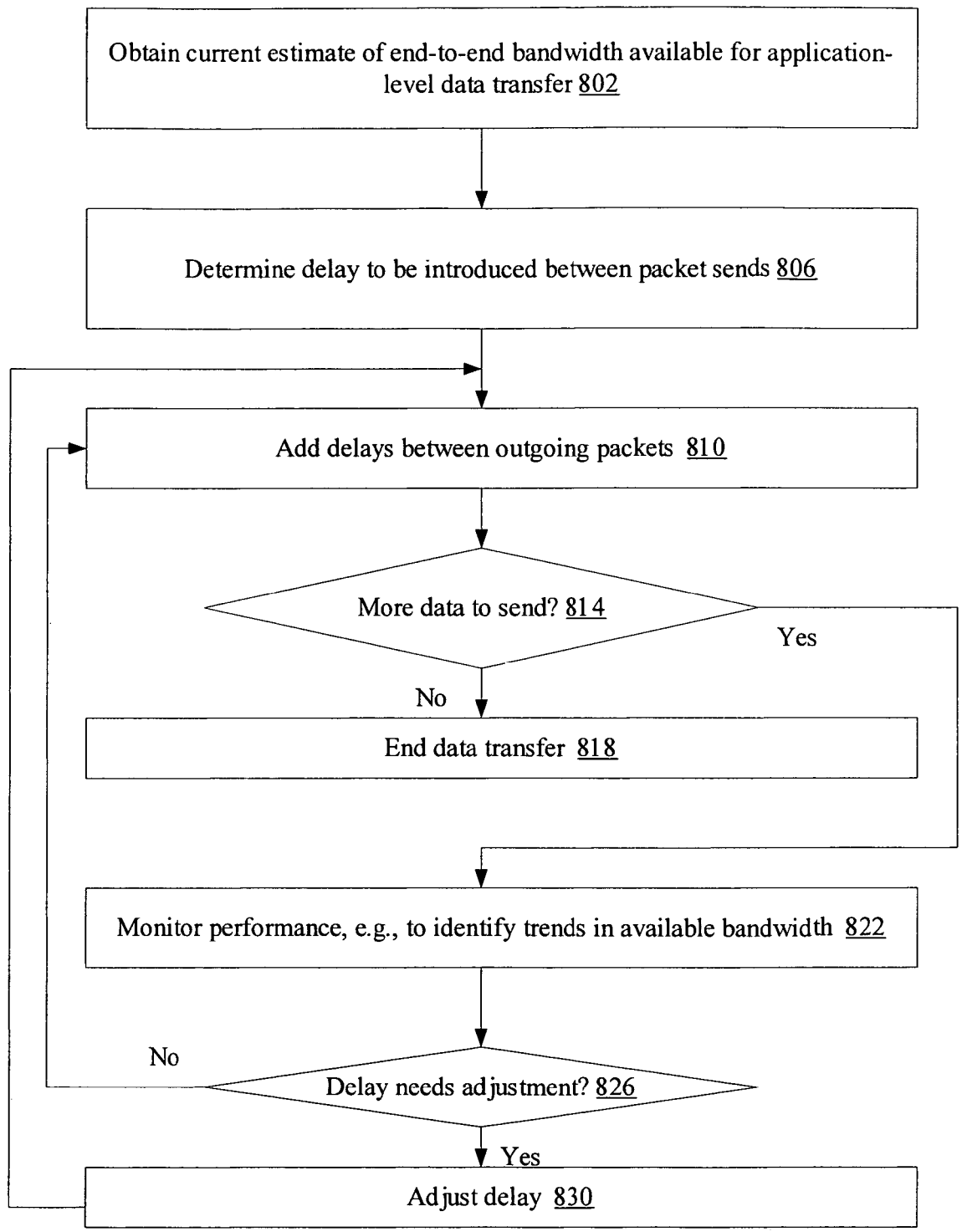
FIG. 8 is a flow diagram illustrating aspects of the operation of a sending traffic manager at an endpoint, according to one embodiment.

FIG. 8 is a flow diagram illustrating aspects of the operation of a sending traffic manager 170 at an endpoint 110, according to one embodiment. As shown in block 802, the traffic manager 170 may be configured to obtain an estimate of currently available end-to-end bandwidth for the application level data transfer in progress. The estimate may be obtained from any of a variety of sources in different embodiments: e.g., an application 120 itself may be configured to report achieved bandwidth, the traffic manager 170 may instrument packets of the data transfer as described above, the traffic manager 170 may rely on a third-party tool or network monitor, etc. In some embodiments, the estimate may be an average derived from a plurality of data points, such as a running average recomputed for the last N packets transmitted every time an acknowledgement is received. In one embodiment, the traffic manager 170 may be configured to obtain estimates from a plurality of sources (such as the application and an external tool) and to either derive an average of the values from the different sources or select one of the sources based on a specified policy (e.g., the source that reports the lowest or most conservative throughput rates may be selected).

Based at least in part on the estimate of available end-to-end bandwidth, the traffic manager 170 may be configured to determine a delay to be introduced between packet sends (block 806) and introduce the delays into the outbound packet sequence corresponding to the application-level data transfer (block 810). For example, if the estimated available bandwidth is 5 Megabits per second, and bursts of data are being generated at the sending application at 25 Megabits per second, the traffic manager 170 may compute a delay that effectively reduces the outbound data rate for the data transfer to slightly less than 5 Megabits per second. The delays may be introduced, for example, to "smoothen" or reduce spikes in the outgoing data transfer before the data leaves the sending endpoint and enters the network, so that the likelihood of micro-congestion (e.g., buffer overruns) at network devices 130 such as routers, switches, etc., is reduced. The traffic manager thus adapts the traffic flow to current conditions on a per-application task basis. In some embodiments, the traffic manager 170 may be configured to obtain the estimates and determine and introduce the delays on a per-connection basis. For example, if a given application task involves data transfer over a particular connection (e.g., a socket connection), an estimate for the bandwidth available for that particular connection may be obtained, and delays specifically computed for that particular connection may be introduced between packets sent on that particular connection. If the same application uses another connection for another data transfer (e.g., to a different receiving endpoint), a different delay may be used for the other connection, based on the current conditions pertaining to the other connection, indicated by an estimate of the bandwidth available for the other connection. Thus, the parameters used to adjust outgoing traffic flow may differ from one connection to another, and/or from one application task to another, even for the same application at the same endpoint. Concurrent data transfers originating from the same endpoint (for the same sending application or for different applications) may have different estimated available bandwidths and different introduced delays.

In some embodiments, one or more input parameters may be used to control aspects of the operation of a traffic manager 170. For example, an input parameter may be used to specify how closely traffic manager 170 should attempt to match the estimated available bandwidth for a given application's data transfers or for a particular data transfer. If the input parameter indicates that the traffic manager 170 should be aggressive and attempt to maximize throughput as much as possible, the duration of the introduced delays may be set such that the sending transfer rate is equal to, or very slightly lower than, the estimate of available bandwidth. If the input parameter indicates that the traffic manager should not be as aggressive in maximizing throughput, longer delays may be introduced at least initially: e.g., if the available bandwidth is estimated at 10 Megabits/second, delays that reduce the outgoing traffic rate to 8 Megabits/second or even lower may be introduced. Parameters may also be used to indicate relative priorities of different applications or different tasks (which may then be used by the traffic manager 170 to reduce delays for a high-priority data transfer more quickly than for a low-priority data transfer), the minimum durations of monitoring periods to use for estimating available bandwidth, etc., in various embodiments. In one embodiment, a maximum allowed delay may be specified using an input parameter, while in another embodiment, input parameters may be used to identify one or more applications for which no delays are to be introduced. Parameters may also be used to control various other aspects of the operation of traffic manager 170, such as whether packets containing application data are to be instrumented or whether diagnostic packets are to be used instead to estimate available bandwidth. Input parameters for traffic manager 170 may be specified via any of a variety of interfaces in various embodiments, such as a graphical user interface (GUI), one or more parameter files, environment variables, command-line options, etc.

After delays based on estimated bandwidth availability are introduced between a set of packets, the traffic manager 170 may determine if more data remains to be sent for the current data transfer (block 814 of FIG. 8). The sending application 120 may in some embodiments provide an indication to the traffic manager 170 when all the data has been transferred successfully, e.g., by closing a socket connection that was being used for the transfer. If no more data is to be sent, the traffic manager may end the data transfer (block 818). If, however, data remains to be sent, in one embodiment traffic manager 170 may be configured to monitor ongoing performance of the data transfer (block 822), e.g., to observe the effect of the delays and to identify trends in available bandwidth. The trends may indicate how available bandwidth varies over a time period (e.g., the last second or the last minute) in which data points corresponding to different points in time were obtained. For example, transfer times for several packets whose sending times were separated by introduced delays may be obtained using the instrumentation techniques described above, and may be used to determine how closely the actual achieved transfer rate matches the sending rate (the rate at which the data is emitted from the sending endpoint). The results of the monitoring may be used to determine whether the duration of the introduced delays needs to be adjusted (block 826), and if so, a modified delay duration may be determined (block 830) and applied to the a subsequent set of packets (block 810). The adjustments to outgoing traffic pattern of a given data transfer may be performed in real time, and may be based on real time measurements on a per-connection and/or a per-data-transfer level. Operations corresponding to blocks 810, 822, 822 and 826 may be repeated until the data transfer eventually ends.

In adjusting the delays, the traffic manager 170 may generally attempt to maximize throughput in view of the latest results of the monitoring. For example, if the traffic manager 170 determines that the throughput achieved for the current data transfer continues is falling, despite the introduction of a particular delay between successive packets, the duration of the delay may be increased for subsequent packets. If the achieved throughput matches the rate at which the packets are being sent, the delay may be shortened to see if the network can now provide a higher bandwidth. Various parameters described above, such as relative priorities, allowed ranges of inter-packet delays, etc., may also be used in making the adjustments. It is noted that in various embodiments, not all the operations illustrated in FIG. 8 may be performed as shown, or in the same order as shown. For example, in one implementation, the actual computation of the delay durations may be performed by another software or hardware module, and the durations to be used may be provided to the traffic manager 170 by the other software or hardware module.

Figure 9:
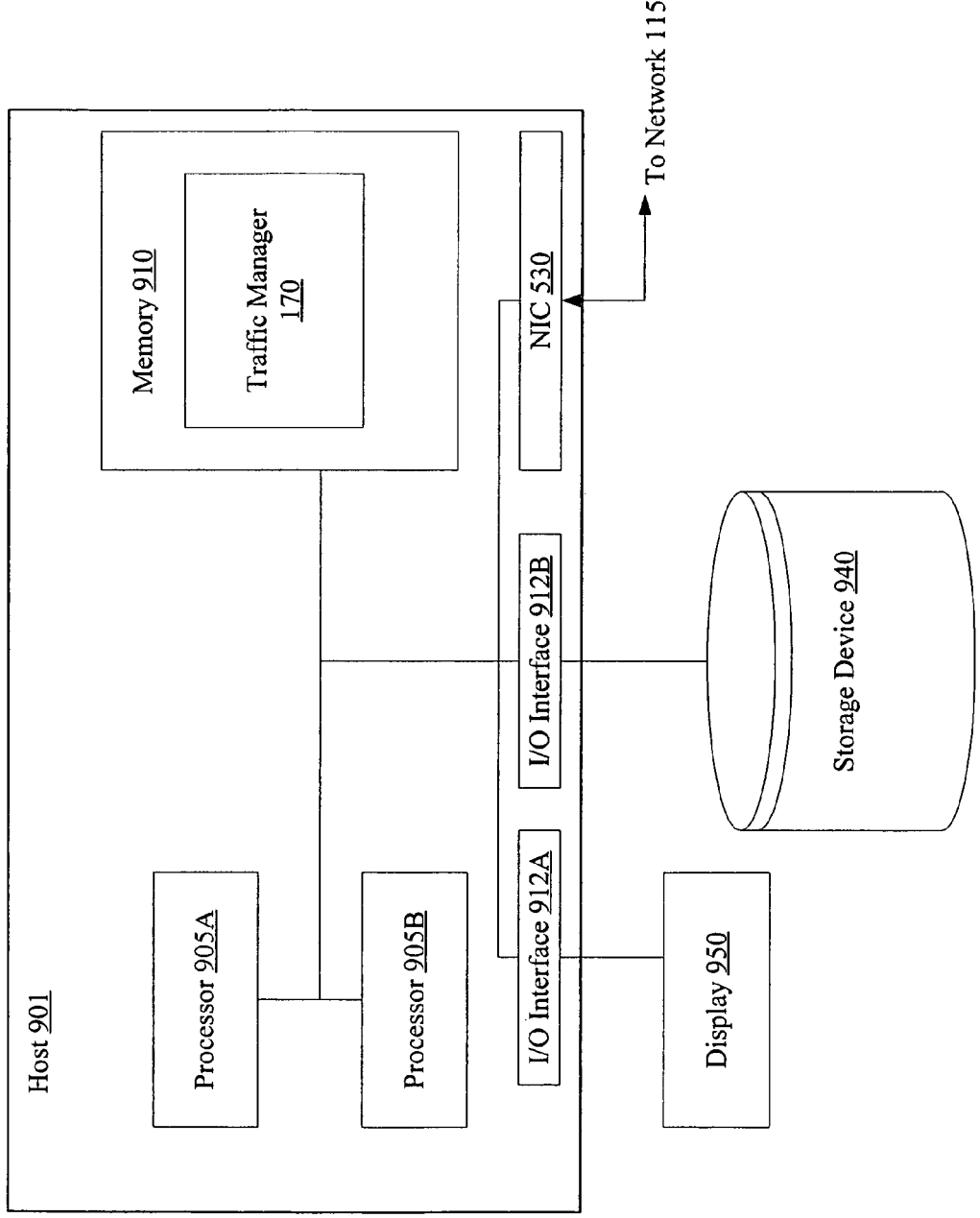
FIG. 9 is a block diagram of a computer host that may be used as an endpoint, according to one embodiment.

FIG. 9 is a block diagram of a computer host 901 that may be used as an endpoint 110 (e.g., either as a sending endpoint or a receiving endpoint), according to one embodiment. As shown, host 901 may include one or more processors 905, such as processors 905A and 905B. In various embodiments, processors 905 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of traffic managers 170 may be partly or fully resident within a memory 910 at a given point in time, and may also be stored on a storage device 940. Memory 910 may be implemented using any appropriate medium such as any of various types of RAM (e.g., DRAM, SDRAM, RDRAM, SRAM, etc.). In addition to processors 905 and memory 910, host 901 may also include one or more I/O interfaces 912, such as I/O interface 912A to a display device 950, I/O interface 912B providing access to storage devices 940, one or more network interface cards (NICs) 530 providing access to a network 115, and the like. Display device 950 may be used, for example, to display one or more of the user interfaces provided by traffic manager 170 to specify input parameters described above. Any of a variety of storage devices 940 may be used to store the instructions as well as data for traffic manager 170 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 940 may be directly coupled to host 901 in some embodiments (e.g., using the Small Computer Systems Interface (SCSI) protocol), or may be accessible over any desired storage interconnect such as a fiber channel fabric or storage area network (SAN) in other embodiments.

In addition to traffic manager 170, memory 910 and/or storage devices 940 may also store operating systems software and/or software for various applications 120 in various embodiments. In some embodiments, part or all of traffic manager 170 may be included an operating system, a storage management software product or another software package, while in other embodiments, traffic manager 170 may be packaged as a standalone product. In some embodiments, the component modules of a traffic manager 170 may be distributed across multiple hosts 901, or may be replicated at a plurality of hosts 901. In one embodiment, part or all of the functionality of traffic manager 170 may be implemented via one or more hardware devices (e.g., via one or more Field Programmable Gate Array (FPGA) devices) or in firmware. It is noted that in addition to or instead of computer hosts, in some embodiments endpoints 110 linked to network 115 may include a variety of other devices configured to implement applications 120 and traffic managers 170, such as television set-top boxes, mobile phones, intelligent stereo devices, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
    one or more processors; and
    memory coupled to the one or more processors, wherein the memory comprises program instructions executable by the one or more processors to:
        obtain an estimate of end-to-end network bandwidth available to a particular application-level data transfer operation in progress over a network between a first endpoint and a second endpoint; and
        introduce, based at least in part on the estimate of end-to-end network bandwidth available, a delay between transmissions of two or more successive messages of the particular application-level data transfer operation from the first endpoint to the second endpoint.

2. The system as recited in claim 1, wherein the instructions are further executable to:
    compute, based at least in part on the estimate of end-to-end network bandwidth available, a duration of the delay.

3. The system as recited in claim 1, wherein the delay is introduced between a transmission of two or more successive messages from a user-mode software layer to a kernel-mode software layer.

4. The system as recited in claim 1, wherein the delay is introduced between a transmission of two or more successive messages from a network adapter driver software layer to a hardware network adapter.

5. The system as recited in claim 1, wherein the estimate of end-to-end network bandwidth is obtained using user-mode software instrumentation without modifying a standard networking software stack, wherein the user-mode software instrumentation comprises an inclusion of a timestamp in a network packet of the application-level data transfer, wherein the network packet comprises a header portion and a data portion, wherein the header portion is formatted in accordance with a standard networking protocol, and wherein the timestamp is included in the data portion.

6. The system as recited in claim 5, wherein the user-mode software instrumentation comprises an inclusion of an identification of the particular application-level data transfer operation in the data portion of the network packet.

7. The system as recited in claim 1, wherein the instructions are further executable to:
obtain a plurality of estimates of end-to-end network bandwidth available to the particular application-level data transfer operation in progress, wherein each of the plurality of estimates corresponds to a different point in time;
identify a trend in the estimates of end-to-end network bandwidth available for the particular application-level data transfer operation over a time period using the plurality of estimates; and
adjust, based at least in part on the trend, delays between transmissions of two or more successive messages of the particular application-level data transfer operation from the first endpoint.

8. The system as recited in claim 1, wherein the application-level data transfer operation is performed on behalf of a storage management application.

9. The system as recited in claim 1, wherein the application-level data transfer operation is performed on behalf of a telecommunication application.

10. The system as recited in claim 1, wherein the first endpoint is linked via the network to a plurality of receiver endpoints including a first receiver endpoint and a second receiver endpoint, wherein the first endpoint is linked to the first receiver endpoint via a first network connection to perform a first application-level data transfer operation, wherein the first endpoint is linked to the second receiver endpoint via a second network connection to perform a second application-level data transfer operation, wherein the instructions are further executable to:
obtain a first estimate of end-to-end network bandwidth available to the first application-level data transfer operation over the first connection;
obtain a second estimate of end-to-end network bandwidth available to the second application-level data transfer operation over the second connection;
introduce, based at least in part on the first estimate, a first delay between transmissions of two or more successive messages of the first application-level data transfer operation from the first endpoint; and
introduce, based at least in part on the second estimate, a second delay between transmissions of two or more successive messages of the second application-level data transfer operation from the first endpoint, wherein the first delay differs from the second delay.

11. A computer-implemented method, comprising:
a computer system performing:
obtaining an estimate of end-to-end network bandwidth available to a particular application-level data transfer operation in progress over a network between a first endpoint and a second endpoint; and
introducing, based at least in part on the estimate of end-to-end network bandwidth available, a delay between transmissions of two or more successive messages of the particular application-level data transfer operation from the first endpoint to the second endpoint.

12. The method as recited in claim 11, wherein the delay is introduced between a transmission of two or more successive messages from a user-mode software layer to a kernel-mode software layer.

13. The method as recited in claim 11, wherein the delay is introduced between a transmission of two or more successive messages from a network adapter driver software layer to a hardware network adapter.

14. The method as recited in claim 11, wherein said obtaining the estimate of the end-to-end network bandwidth comprises using user-mode software instrumentation without modifying a standard networking software stack, wherein the user-mode software instrumentation comprises an inclusion of a timestamp in a network packet of the application-level data transfer, wherein the network packet comprises a header portion and a data portion, wherein the header portion is formatted in accordance with a standard networking protocol, and wherein the timestamp is included in the data portion.

15. The method as recited in claim 11, further comprising:
obtaining a plurality of estimates of end-to-end network bandwidth available to the particular application-level data transfer operation in progress, wherein each of the plurality of estimates corresponds to a different point in time;
identifying a trend in the estimates of end-to-end network bandwidth available for the particular application-level data transfer operation over a time period using the plurality of estimates; and
adjusting, based at least in part on the trend, delays between transmissions of two or more successive messages of the particular application-level data transfer operation from the first endpoint.

16. A tangible, computer-readable medium comprising program instructions, wherein the instructions are computer-executable to:
obtain an estimate of end-to-end network bandwidth available to a particular application-level data transfer operation in progress over a network between a first endpoint and a second endpoint; and
introduce, based at least in part on the estimate of end-to-end network bandwidth available, a delay between transmissions of two or more successive messages of the particular application-level data transfer operation from the first endpoint to the second endpoint.

17. The computer readable medium as recited in claim 16, wherein the delay is introduced between a transmission of two or more successive messages from a user-mode software layer to a kernel-mode software layer.

18. The computer readable medium as recited in claim 16, wherein the delay is introduced between a transmission of two or more successive messages from a network adapter driver software layer to a hardware network adapter.

19. The computer readable medium as recited in claim 16, wherein the estimate of the end-to-end network bandwidth is obtained using user-mode software instrumentation without modifying a standard networking software stack, wherein the user-mode software instrumentation comprises an inclusion of a timestamp in a network packet of the application-level data transfer, wherein the network packet comprises a header portion and a data portion, wherein the header portion is formatted in accordance with a standard networking protocol, and wherein the timestamp is included in the data portion.

20. The computer readable medium as recited in claim 16, wherein the instructions are further executable to:

obtain a plurality of estimates of end-to-end network bandwidth available to the particular application-level data transfer operation in progress, wherein each of the plurality of estimates corresponds to a different point in time;

identify a trend in the estimates of end-to-end network bandwidth available for the particular application-level data transfer operation over a time period using the plurality of estimates; and adjust, based at least in part on the trend, delays between transmissions of two or more successive messages of the particular application-level data transfer operation from the first endpoint.

\* \* \* \* \*

UNITED STATES PATENT AND TRADEMARK OFFICE
CERTIFICATE OF CORRECTION

PATENT NO.       : 7,616,585 B1                                                    Page 1 of 1
APPLICATION NO. : 11/364050
DATED            : November 10, 2009
INVENTOR(S)      : Kritov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this

Nineteenth Day of October, 2010

David J. Kappos
*Director of the United States Patent and Trademark Office*